United States Patent [19]

Hirunuma et al.

[11] Patent Number: 6,078,436
[45] Date of Patent: Jun. 20, 2000

[54] MECHANISM CORRECTING A TREMBLING OF FOCUSED IMAGE

[75] Inventors: Ken Hirunuma, Tokyo; Shinji Tsukamoto, Saitama; Shigeo Enomoto, Tokyo, all of Japan

[73] Assignee: Asahi Kogaku Kogyo Kabushiki Kaisha, Tokyo, Japan

[21] Appl. No.: 09/064,098

[22] Filed: Apr. 22, 1998

[30] Foreign Application Priority Data

Apr. 24, 1997 [JP] Japan .................................. 9-121789
Apr. 30, 1997 [JP] Japan .................................. 9-126449

[51] Int. Cl.⁷ ............................ G02B 15/14; G02B 27/64
[52] U.S. Cl. .......................... 359/694; 359/354; 359/557
[58] Field of Search .................................. 359/694, 554, 359/557, 407, 409

[56] References Cited

U.S. PATENT DOCUMENTS 5,583,692  12/1996  Funatsu .
5,672,862   9/1997  Ohara et al. .
5,917,653   6/1999  Taniguchi ................................ 359/557

FOREIGN PATENT DOCUMENTS 2-284113  11/1990  Japan .
7-43647    2/1995  Japan .
9-61728    3/1997  Japan .
10-20213   1/1998  Japan .
10-83007   3/1998  Japan .

OTHER PUBLICATIONS

Copy of an English Language Translation of JP No. 2–284113. Nov. 21, 1990.

Copy of an English Language Translation of JP No. 9–61728. Mar. 7, 1997.

Copy of an English Language Translation of JP No. 10–20213. Jan. 23, 1998.

An English Language Translation of JP Patent No. 10–83007. Mar. 31, 1998.

*Primary Examiner*—Georgia Epps
*Assistant Examiner*—Michael A Lucas
*Attorney, Agent, or Firm*—Greenblum & Bernstein, P.L.C.

[57] ABSTRACT

A pair of correction lenses is unitarily held by a holding plate in binoculars. The direction and the amount of the movement of the focused image occurring due to hand tremble while utilizing hand-held binoculars, are detected. The holding plate is driven in the vertical and horizontal directions, so that the direction and the magnitude of the movement of the focused image are canceled by the correction lenses.

23 Claims, 11 Drawing Sheets

MECHANISM CORRECTING A TREMBLING OF FOCUSED IMAGE

BACKGROUND OF THE INVENTION

1. Field of the Invention

The present invention relates to a mechanism, provided in binoculars, for correcting a trembling of a focused image.

2. Description of the Related Art

Conventionally, there is known a correction mechanism, provided in binoculars, for correcting a trembling of a focused image, as described in Japanese Unexamined Patent Publication (Kokai) No.07-43647. In the binoculars, a pair of optical systems, for a right and left eye, is provided, and a correction mechanism correcting a trembling of a focused image is provided for each of the optical systems. The correction mechanisms are independent of each other, requiring that a control mechanism, which is capable of driving the correction mechanisms simultaneously, but independently, be provided in the binoculars. Accordingly, control of the correction mechanisms is complicated and the structure of the binoculars is large.

SUMMARY OF THE INVENTION

Therefore, an object of the present invention is to provide a simple and compact correction mechanism, which cancels the trembling accompanying the focused image when utilizing hand-held binoculars. Note that, in this specification, "vertical direction" means a direction which is perpendicular to a plane in which a pair of parallel optical axes of the optical systems lie, and "horizontal direction" means a direction which is parallel to the plane and is perpendicular to the parallel optical axes.

In accordance with an aspect of the present invention, there is provided a mechanism correcting a trembling of a focused image, comprising: a holding member which holds a first optical correction system and a second optical correction system, the first optical correction system corrects a trembling of a focused image with respect to a first optical axis of a first telephoto optical system, the second optical correction system corrects a trembling of a focused image with respect to a second optical axis of a second telephoto optical system; and a control member which drives the holding member in the two-dimensions of a plane which is perpendicular to both the first optical axis and the second optical axis, whereby the trembling of the focused image, formed by both the first telephoto optical system and the second telephoto optical system, is eliminated.

The first telephoto optical system includes a first optical inversion system. The second telephoto optical system includes a second optical inversion system. The holding member is placed closer to an object than the first optical inversion system and the second optical inversion system.

The first telephoto optical system includes a first objective lens; and the second telephoto optical system includes a second objective lens. The holding member is provided in such a manner that the first optical correction system is placed between the first optical inversion system and the first objective lens, and the second optical correction system is placed between the second optical inversion system and the second objective lens.

Further, according to the present invention, the optical correction system is provided between the objective lens and the optical inversion system. Accordingly, the optical correction system does not exert harmful damage on a mechanism of interpupillary adjustment in which the eyepiece is rotated around the optical axis of the objective lens.

Preferably, the first optical correction system and the second optical correction system are objective lenses. Accordingly, extra optical systems for correcting the trembling of the focused image are unnecessary. Further, since the objective lenses can be moved as a single unit, i.e. unitarily, the structure for enabling correction of a tremble is simple.

The control member comprises direct-drive-type actuators.

The first telephoto optical system includes a first eyepiece, and the second telephoto optical system includes a second eyepiece. The first optical inversion system and the first eyepiece are unitarily supported, enabling rotation around the optical axis of the first objective lens; and the second optical inversion system and the second eyepiece are unitarily supported, enabling rotation around the optical axis of the second objective lens. Accordingly, interpupillary adjustment can be performed.

The first telephoto optical system includes a first eyepiece, and the second telephoto optical system includes a second eyepiece. The first eyepiece and the second eyepiece are unitarily driven, in such a manner that the first eyepiece is moved along the optical axis of the first eyepiece and the second eyepiece is moved along the optical axis of the second eyepiece, so that a focusing operation can be performed.

The mechanism correcting the trembling of a focused image further comprises: a driving plate, which is positioned in a plane parallel to a first plane in which both the first optical axis and the second optical axis lie; a drive system, which moves the driving plate in the parallel plane; and a link mechanism, which converts the movement of the driving plate, in the parallel plane, to a movement of the holding member in a second plane perpendicular to both the first optical axis and the second optical axis; wherein the holding member is a rectangular plate.

Movement of the driving plate in the horizontal direction in the parallel plane is transmitted to the holding member via the link mechanism, whereby the holding member is moved in the horizontal direction; and movement of the plate, on the parallel plane, which is parallel to the first optical axis and the second optical axis, is transmitted to the holding member via the link mechanism, whereby the holding member is moved in the vertical direction.

The mechanism is applied to binoculars.

In a state in which the binoculars are normally used, the driving plate is positioned at the upper side of the holding member. The link mechanism is disposed beyond a peripheral edge of the first optical correction system and the second optical correction system. The drive system comprises a first driving mechanism moving the holding member in the horizontal direction; and a second driving mechanism moving the holding member in the vertical direction.

Each of the first driving mechanism and the second driving mechanism comprises: a coil disposed on the upper surface of the driving plate; a first yoke attached to the inner side of the body of the binoculars, facing the lower side of the driving plate; a second yoke attached to a portion of the inner side of the body of the binoculars, which corresponds to the first yoke; and a magnet attached to the second yoke. The coil is placed within a magnetic flux generated among the magnet and the first yoke and the second yoke.

The link mechanism preferably comprises: a guide pin fixed on the holding member; a screw engaged with the driving plate; a link having a holding member supporting portion, enabling the guide pin to be received, a drive system supporting portion with which the screw is threadingly and rotatably engaged, and a connecting portion which connects the holding member supporting portion and the drive system supporting portion; and a guide groove located on the body of the binoculars, which leads the guide pin of the holding member in the vertical direction and allows movement of the guide pin of the holding member in the horizontal direction.

The link mechanism preferably comprises: a gear which is engaged with a rack provided at one end of the driving plate and a rack provided at one end of the holding member; a guide pin formed on the side of the holding member; and a guide groove located on the inner side of the body of the binoculars, which leads the guide pin of the holding member in the vertical direction and allows the movement of the guide pin of the holding member in the horizontal direction.

A center of the driving plate lies on an axis, which is parallel to the optical axis of the first telephoto optical system and the optical axis of the second telephoto optical system, and about which the first driving mechanism and the second driving mechanism are symmetrically placed.

One of the first driving mechanism and the second driving mechanism is disposed at the center of the plate, a pair of the remaining driving mechanisms is placed symmetrically about the driving mechanism located at the center of the plate.

In accordance with another aspect of the present invention, there is provided a mechanism correcting a trembling of a focused image, comprising: a holding plate which unitarily holds a pair of optical correction systems, which correct a trembling of a focused image about the optical axes of a pair of telephoto optical systems; a driving plate being parallel to a plane in which the optical axes lie; a drive system which drives the driving plate in a plane parallel to the plane in which the optical axes lie; a link mechanism which converts the movement of the driving plate in the parallel plane to a movement of the holding plate in a plane which is perpendicular to the optical axes.

In accordance with another aspect of the present invention, there is provided a mechanism correcting a trembling of a focused image comprising: a first optical correction system being coaxial with a first optical axis of a first telephoto optical system; a second optical correction system being coaxial with a second optical axis of a second telephoto optical system; a holding member holding the first optical correction system and the second optical system; and a control member driving the holding member in the two dimensions of a plane perpendicular to both the first optical axis and the second optical axis, so that a trembling of a focused image on the first optical axis and the second optical axis is corrected.

In accordance with another aspect of the present invention, there is provided a mechanism correcting a trembling of a focused image comprising: a first optical correction system including a first optical axis on which an image is focused; a second optical correction system including a second optical axis on which the image is focused; a holding member holding the first optical correction system and the second optical system; and a control member driving the holding member in the two dimensions of a plane perpendicular to both the first optical axis and the second optical axis, so that a trembling of the focused image is corrected.

Namely, the driving mechanism of the holding plate is disposed on a plane which is parallel to the plane in which the optical axes of the correction lenses lie. Accordingly, the structure of the binoculars is compact.

As described above, according to the present invention, the first and the second optical correction systems are held by the holding member, and by driving the holding member, the trembling of the perceived focused image is corrected. Accordingly, one set of an actuator, a detector need only be provided for each of a vertical trembling and a horizontal trembling about an optical axis, enabling the control of a tremble correction system to be simplified and the structure of a tremble correction system to be compact.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
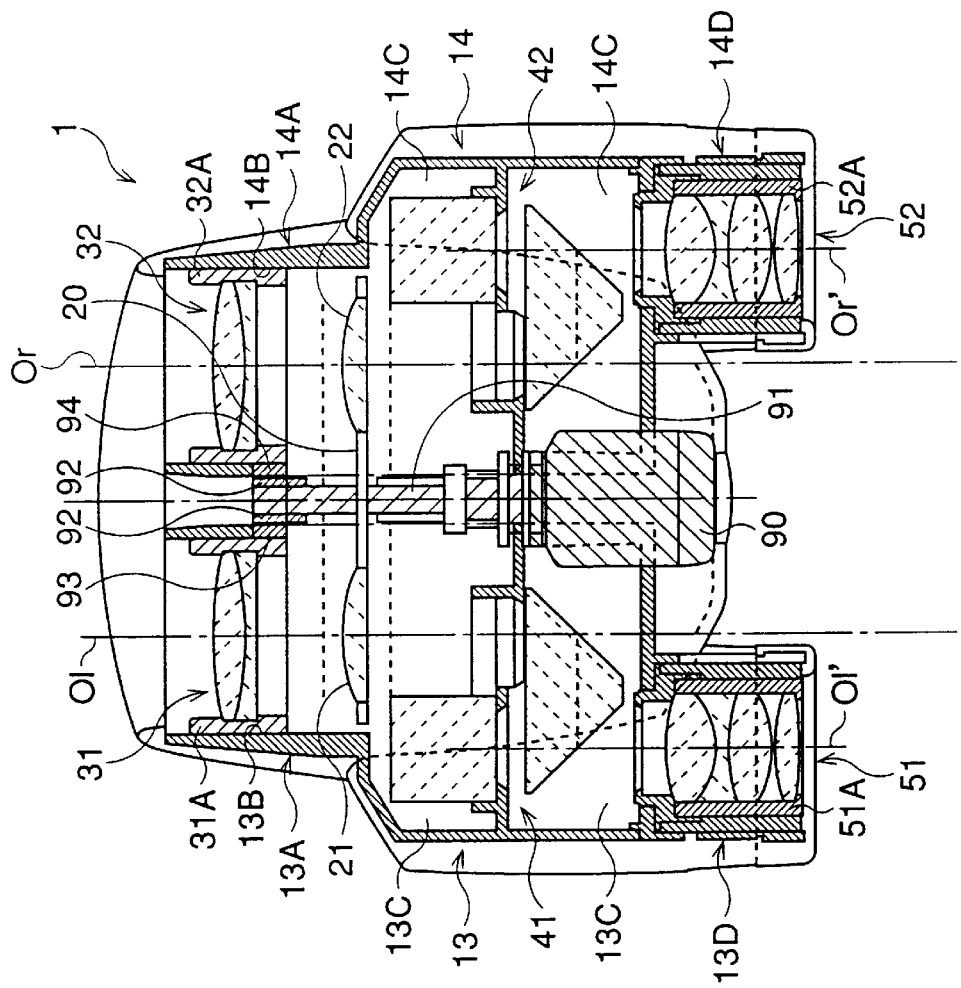
FIG. 1 is a sectional view of binoculars incorporating a first embodiment, according to the present invention.

The present invention will now be described with reference to embodiments shown in the drawings.

FIG. 1 is a sectional view of binoculars 1 incorporating a first embodiment, according to the present invention.

A luminance flux passes a pair of objective lenses 31 and 32, and is directed to a pair of optical inversion systems 41 and 42, through a pair of correction lenses 21 and 22. Each of the optical inversion systems 41, 42 is a Porro prism, comprising two right-angle prisms, which inverts an image thereby producing an erected image. The luminance flux is directed to a pair of eyepieces 51 and 52, after passing through the pair of optical inversion systems 41, 42. Namely, a left telephoto optical system (a first telephoto optical system) comprises the correction lens 21, the objective lens 31, the optical inversion system 41, and the eyepiece 51; and a right telephoto optical system (a second telephoto optical system) comprises the correction lens 22, the objective lens 32, the optical inversion system 42, and the eyepiece 52. Ol is the optical axis of the objective lens 31, Or is the optical axis of the objective lens 32, Ol' is the optical axis of the eyepiece 51, and Or' is the optical axis of the eyepiece 52.

The objective lens 31 is held by an objective lens barrel 31A, and the objective lens 32 is held by an objective lens barrel 32A. The objective lens barrel 31A is supported by an inner surface of a hole 13B provided on an objective lens barrel supporting portion 13A of a left case 13, in such a manner that the objective lens barrel 31A can be moved along the optical axis Ol. Similarly, the objective lens barrel 32A is supported by an inner surface of a hole 14B provided on an objective lens barrel supporting portion 14A of a right case 14, in such a manner that the objective lens barrel 32A can be moved along the optical axis Or.

The eyepiece 51 is held by an eyepiece barrel 51A, and the eyepiece 52 is held by an eyepiece barrel 52A. The eyepiece barrel 51A is securely mounted in an eyepiece barrel supporting portion 13D of the left case 13, and the eyepiece barrel 52A is securely mounted in an eyepiece barrel supporting portion 14D of the right case 14. The Porro prism of the optical inversion system 41, is placed in a prism room 13C provided between the objective lens barrel supporting portion 13A and the eyepiece barrel supporting portion 13D, in the left case 13. Similarly, the Porro prism of the optical inversion system 42, is placed in a prism room 14C provided between the objective lens barrel supporting portion 14A and the eyepiece barrel supporting portion 14D, in the right case 14.

One engaging member (not shown), which faces the prism room 14C, is provided on the outer surface of the prism room 13C, and another engaging member (not shown), which faces the prism room 13C, is provided on the outer surface of the prism room 14C, whereby the prism room 13C and the prism room 14C are engaged with each other.

A rotation ring 90 is provided between the eyepiece barrel 51A and the eyepiece barrel 52A. A rotation ring axle 91 is fixed to the rotation ring 90, along the central axis of the rotation ring 90. A lift axle 92 is threadingly engaged with the rotation ring axle 91. The lift axle 92 is connected to the objective lens barrel 31A by a left arm 93, and is connected to the objective lens barrel 32A by a right arm 94.

When the rotation ring 90 is rotated, rotational movement is transmitted to the lift axle 92 via the rotation ring axle 91, so that the lift axle 92 moves along the optical axes Ol and Or. Namely, the rotational movement of the rotation ring 90 is converted to the longitudinal movement of the lift axle 92, in the direction of the optical axes Ol and Or. In the left telephoto optical system, the movement of the lift axle 92 is transmitted to the objective lens barrel 31A by the left arm 93. Similarly, in the right telephoto optical system, the movement of the lift axle 92 is transmitted to the objective lens barrel 32A by the right arm 94. Accordingly, the objective lens barrels 31A and 32A are moved uniformly and simultaneously, in accordance with the movement of the lift axle 92, in the direction of the optical axes Ol and Or.

Namely, the rotation ring 90, the rotation ring axle 91, the lift axle 92, the left and right arms 93 and 94, and the objective lens barrels 31A and 32A, constitute an integrated focusing unit. The synchronized movement of the objective lens barrels 31A and 32A, along the respective optical axis Ol and Or, is initiated by rotating the rotation ring 90. Accordingly, a focusing operation can be performed by rotating the rotation ring 90 clockwise or counterclockwise by a predetermined amount.

Further, the left case 13 is rotatable around the optical axis Ol of the objective lens 31 and the right case 14 is rotatable around the optical axis Or of the objective lens 32, in accordance with the alternation of engaging position of the engaging members, with respect to each of the prism rooms 13C and 14C of the left case 13 and the right case 14. The rotation of the left case 13 and the right case 14 is synchronized and independent of the integrated focusing unit. The left case 13 and the right case 14 are engaged with the facing engaging members located on the outer surfaces of the prism rooms 13C and 14C. Accordingly, when the left case 13 is rotated clockwise around the optical axis Ol, the right case 14 rotates counterclockwise around the optical axis Or, and when the left case 13 is rotated counterclockwise around the optical axis Ol, the right case 14 rotates clockwise around the optical axis Or, so that the interpupillary distance is adjusted.

Figure 2:
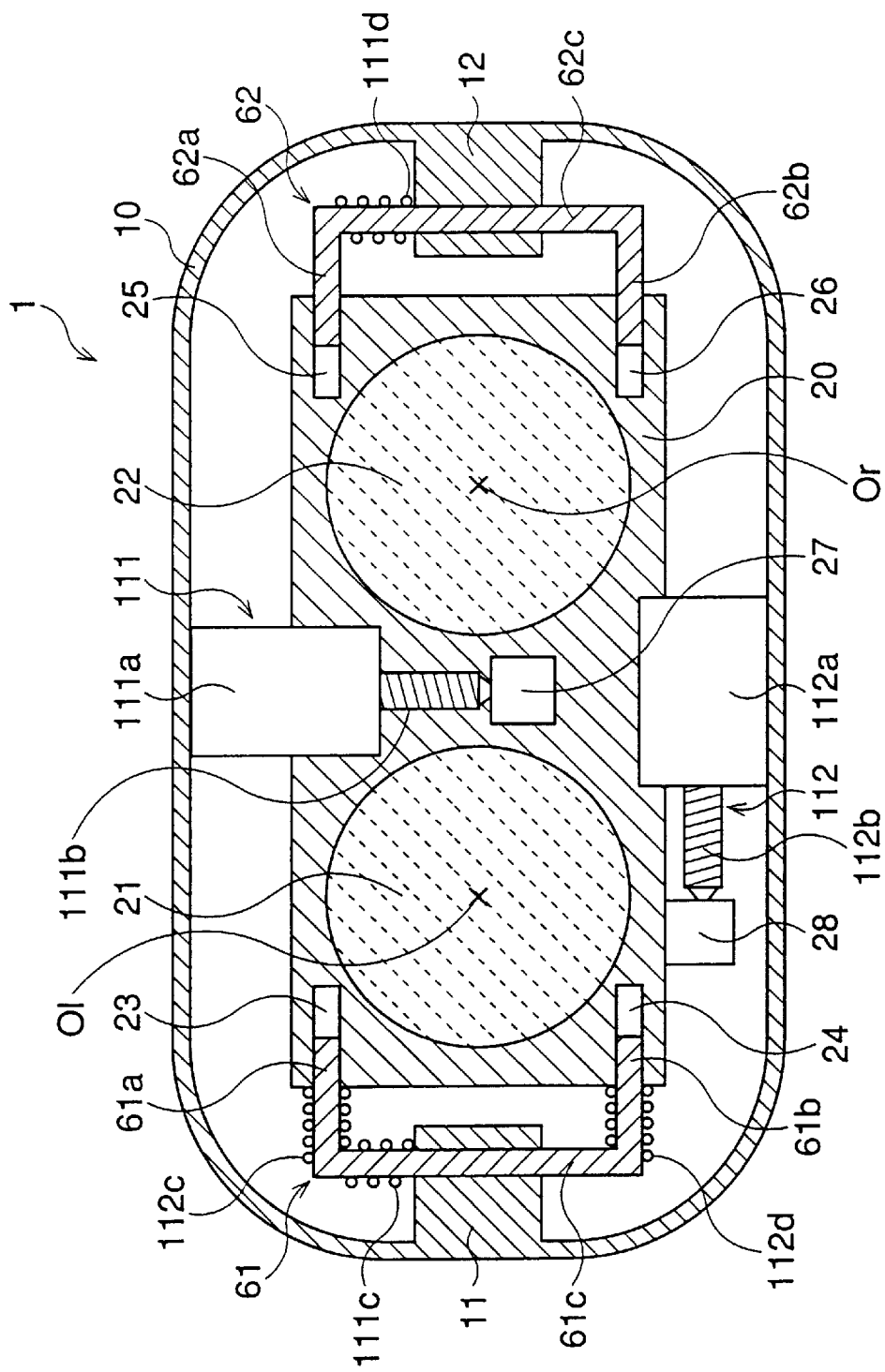
FIG. 2 is a sectional view of the binoculars, according to the first embodiment, taken in a plane which is close to the correction lenses and is perpendicular to the optical axes of the correction lenses.

FIG. 2 is a sectional view of the binoculars, according to the first embodiment, taken in a plane which is close to the correction lenses 21 and 22, and is perpendicular to the optical axes Ol and Or.

A holding plate 20 is a plate with a generally rectangular configuration. The correction lenses 21 and 22 are securely mounted and symmetrically disposed in the holding plate 20. A hole 23 and a hole 24, which have a predetermined depth, are provided at the top and bottom of an end side surface of the holding plate 20, respectively. A central axis of the holes 23 and 24 is parallel to a plane in which both the optical axis Ol and the optical axis Or lie, and when the optical axis Ol is coplanar with a vertical plane, the axial direction of the holes 23 and 24 creates a normal to the vertical plane. The hole 23 is provided at the upper side, and the hole 24 is provided at the lower side. Further, holes 25 and 26, similar to the holes 23 and 24, are provided at the top and bottom of the other end surface of the holding plate 20, respectively.

A guide bar 61 comprises horizontal-direction guide portions 61a and 61b, which are parallel to each other, and a vertical-direction guide portion 61c, which connects the horizontal-direction guide portions 61a and 61b. The length of the vertical-direction guide portion 61c, along its central axis, approximately equals a distance between the holes 23 and 24. The horizontal-direction guide portion 61a is slidably received by the hole 23, and the horizontal-direction guide portion 61b is slidably received by the hole 24.

A guide bar 62 comprises horizontal-direction guide portions 62a and 62b, which are parallel to each other, and a vertical-direction guide portion 62c, which connects horizontal-direction guide portions 62a and 62b. The length of the vertical-direction guide portion 62c, along its central axis, approximately equals a distance between the holes 25 and 26. The horizontal-direction guide portion 62a is slidably received by the hole 25, and the horizontal-direction guide portion 62b is slidably received by the hole 26.

Namely, the holding plate 20 is supported by the guide bars 61 and 62, and can be moved, in the horizontal direction, between the extremes of the leading-end faces of the horizontal-direction guide portions 61a and 61b abutting against the bottom-end faces of the holes 23 and 24, and the leading-end faces of the horizontal-direction guide portions 62a and 62b abutting against the bottom-end faces of the holes 25 and 26.

The vertical-direction guide portion 61c is supported, so as to be slidable in a longitudinal direction along its central axis, by a projecting portion 11 formed on the inner surface of a cover body 10. Similarly, the vertical-direction guide portion 62c is supported, so as to be slidable in a longitudinal direction along its central axis, by a projecting portion 12 formed on the inner surface of the cover body 10.

Coil springs 112c and 112d are disposed around the horizontal-direction guide portions 61a and 61b. One end of the coil spring 112c and one end of the coil spring 112d abut against an end-side surface of the holding plate 20, so that the coil springs 112c and 112d urge the holding plate 20 in the direction which proceeds from the correction lens 21 to the correction lens 22. A coil spring 111c is wound around the upper portion of the vertical-direction guide portion 61c, above the projecting portion 11. Similarly, a coil spring 111d is wound around the upper portion of the vertical-direction guide portion 62c, above the projecting portion 12. One end of each of the coil springs 111c and 111d abut against the upper surface of the projecting portions 11 and 12, respectively, so that the coil springs 111c and 111d urge the holding plate 20 in the direction which proceeds from the horizontal-direction guide portion 61b to the horizontal-direction guide portion 61a.

A horizontal-direction actuator 112 is provided on an inner surface of the bottom of the cover body 10. The horizontal-direction actuator 112 is a direct-drive-type actuator, such as a linear stepping actuator. The horizontal-direction actuator 112 comprises a stepping motor 112a and a lead screw 112b, being provided in such a manner that the tip of the lead screw 112b, at all times, abuts the side surface of a projecting portion 28, which is provided on the lower side surface of the holding plate 20, due to the urging forces of the coil springs 112c and 112d.

The lead screw 112b extends or retracts in the horizontal direction in accordance with the operation of the stepping motor 112a. When, due to the operation of the stepping motor 112a, the lead screw 112b extends in the direction which proceeds from the correction lens 22 to the correction lens 21 (the left direction in FIG. 2), the movement of the lead screw is transmitted to the holding plate 20 via the projecting portion 28, so that the holding plate 20 moves in the left direction against the urging forces of the coil springs 112c and 112d. When, due to the operation of the stepping motor 112a, the lead screw 112b retracts in the direction which proceeds from the correction lens 21 to the correction lens 22 (the right direction in FIG. 2), the holding plate 20 moves in the right direction due to the urging forces of the coil springs 112c and 112d.

A vertical-direction actuator 111 is provided on an inner surface of the upper side of the cover body 10, between the correction lenses 21 and 22. The vertical-direction actuator 111 is a direct-drive-type actuator, such as a linear stepping actuator. The vertical-direction actuator 111 comprises a stepping motor 111a and a lead screw 111b, being provided in such a manner that the tip of the lead screw 111b at, all times abuts, an upper surface of a projecting portion 27, which is provided on the holding plate 20 between the correct-on lenses 21 and 22, due to the urging forces of the coil springs 111c and 111d.

The lead screw 111b extends or retracts in the vertical direction, in accordance with the operation of the stepping motor 111a. When, due to the operation of the stepping motor 111a, the lead screw 111b extends in the direction which proceeds from the horizontal-direction guide portion 61a to the horizontal-direction guide portion 61b (the down direction in FIG. 2), the movement of the lead screw is transmitted to the holding plate 20 via the projecting portion 27, so that the holding plate 20 moves in the down direction against the urging forces of the coil springs 111c and 111d. When, by the operation of the stepping motor 111a, the lead screw 111b retracts in the direction which proceeds from the horizontal-direction guide portion 61b to the horizontal-direction guide portion 61a (the up direction in FIG. 2), the holding plate 20 moves in the up direction due to the urging forces of the coil springs 111c and 111d.

Figure 3:
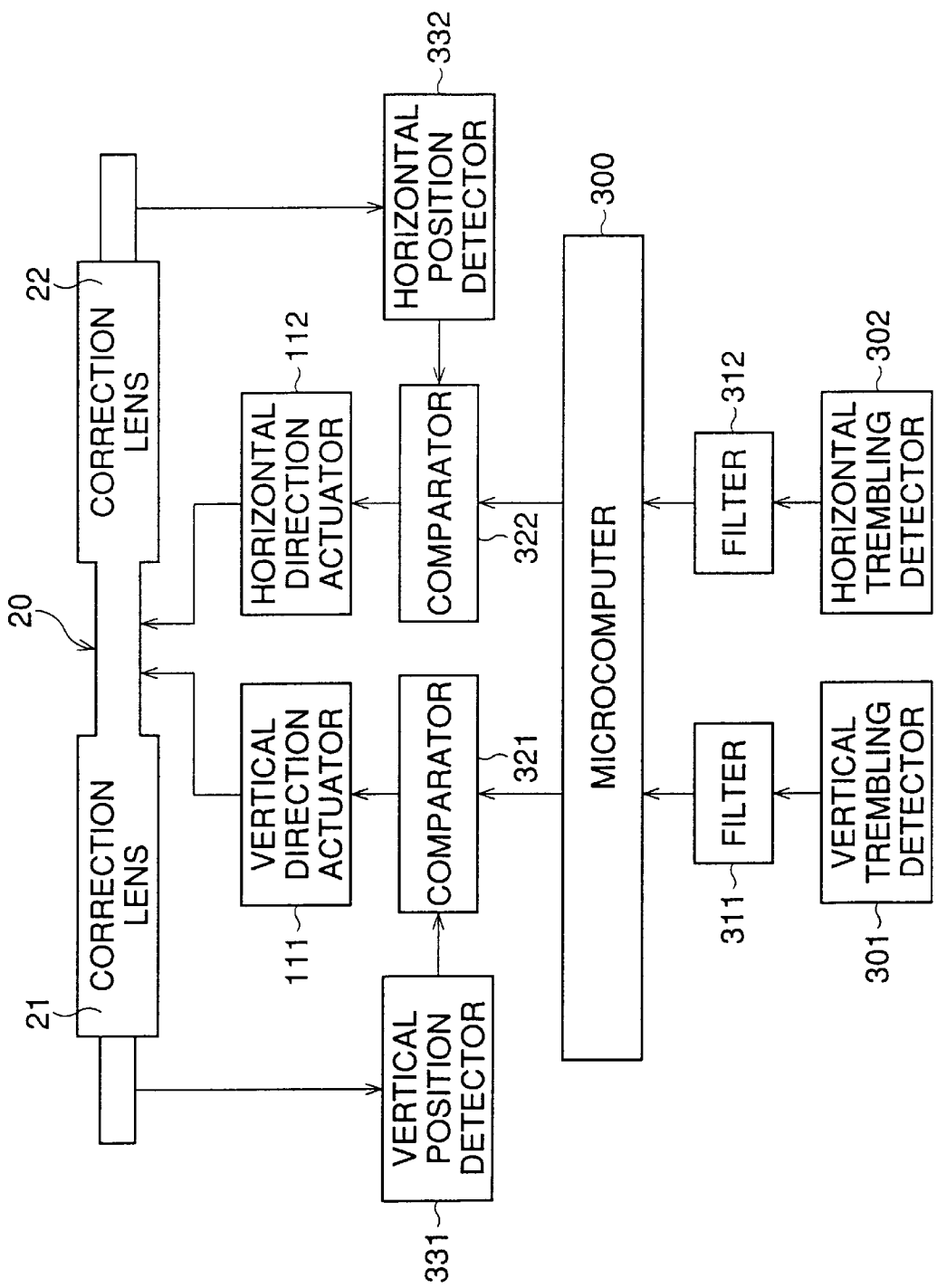
FIG. 3 is a block diagram of the first embodiment.

FIG. 3 is a block diagram of the first embodiment.

A vertical-tremble detector 301 detects the direction and angular speed of the trembling of the binoculars 1, with respect to the vertical direction. The direction of the trembling in the vertical direction includes the movement of the binoculars in the up or the down direction. A horizontal-tremble detector 302 detects the direction and angular speed of the tremble in the horizontal direction. The direction of the trembling in the horizontal direction includes the movement of the binoculars in the left or the right direction.

A filter 311 is connected to the vertical-tremble detector 301, by which noise is extracted from a signal detected by the vertical-tremble detector 301, so that the signal, comprising only a frequency band associated with a hand trembling, is thus outputted as a vertical-tremble signal having direction and angular speed data. Similarly, a filter 312 is connected to the horizontal-tremble detector 302, by which noise is extracted from a signal detected by the horizontal-tremble detector 302, so that the signal comprising only a frequency band associated with a hand trembling, is thus outputted as a horizontal-tremble signal having direction and angular speed data.

The filters 311 and 312 are connected to a microcomputer 300. In the microcomputer 300, based on the vertical-tremble signal inputted from the filter 311, data of the angular speed in the vertical direction is integrated. Thus, the direction and the displacement from the standard position of the holding plate 20 in the vertical direction, being the vertical-tremble correction position of the holding plate 20 by which trembling in the vertical direction is canceled, is calculated. Similarly, based on the horizontal-tremble signal inputted from the filter 312, data of the angular speed in the horizontal direction is integrated. Thus, the direction and the displacement from the standard position of the holding plate 20 in the horizontal direction, being the horizontal-tremble correction position of the holding plate 20 by which the trembling in the horizontal direction is canceled, is calculated. Note that, in this specification, "standard position" means a position in which the optical axis of the correction lens is coaxial with the optical axis of the respective objective lens.

The vertical-tremble correction position is outputted to a comparator 321, and the horizontal-tremble correction position is outputted to a comparator 322.

A vertical-position detector 331 comprises, for example, an LED (Light Emitting Diode) and a PSD (Position Sensitive Device). The vertical-position detector 331 detects a position of the holding plate 20 with respect to the standard position in the vertical direction, and outputs a vertical-position signal to the comparator 321. Similarly, a horizontal-position detector 332, comprising an LED and a PSD, detects a position of the holding plate 20 with respect to the standard position in the horizontal direction, and outputs a horizontal-position signal to the comparator 322.

In the comparator 321, the vertical-tremble correction position outputted from the microcomputer 300 and the vertical-position signal outputted from the vertical-position detector 331 are compared, and a vertical-tremble correction signal is outputted, so that the vertical position of the holding plate 20 corresponds to the vertical-tremble correction position. Similarly, in the comparator 322, the horizontal-tremble correction position outputted from the microcomputer 300 and the horizontal-position signal outputted from the horizontal-position detector 331 are compared, and a horizontal-tremble correction signal is outputted, so that the horizontal position of the holding plate 20 corresponds to the horizontal-tremble correction position.

As described above, the vertical-direction actuator 111 is a linear stepping actuator (direct-drive-type actuator), and comprises the stepping motor 111a and the lead screw 111b. The stepping motor 111a is driven in accordance with the vertical-tremble correction signal outputted from the comparator 321, so that vertical trembling is corrected. The horizontal-direction actuator 112 is also a linear stepping actuator (direct-drive-type actuator), and comprises the stepping motor 112a and the lead screw 112b. The stepping motor 112a is driven in accordance with the horizontal-tremble correction signal outputted from the comparator 322, so that horizontal trembling is corrected. The vertical trembling and the horizontal trembling are corrected, so that the trembling of the focused image is corrected.

According to the first embodiment, the correction lenses 21 and 22 are held by the holding plate 20, and by driving the 20 holding plate 20, the trembling of the focused image is corrected. Accordingly, one set of an actuator, a detector, and so on, is provided for each component of the trembling, i.e. the vertical component and the horizontal component, enabling the control of tremble correction to be simplified and the structure of the tremble correction mechanism to be compact.

Further, according to the first embodiment, the tremble optical correction system is provided between the objective lens and the optical inversion system. Accordingly, the tremble optical correction system does not interfere with an operation of a mechanism for interpupillary adjustment, in which the eyepiece is rotated around the optical axis of the objective lens.

Figure 4:
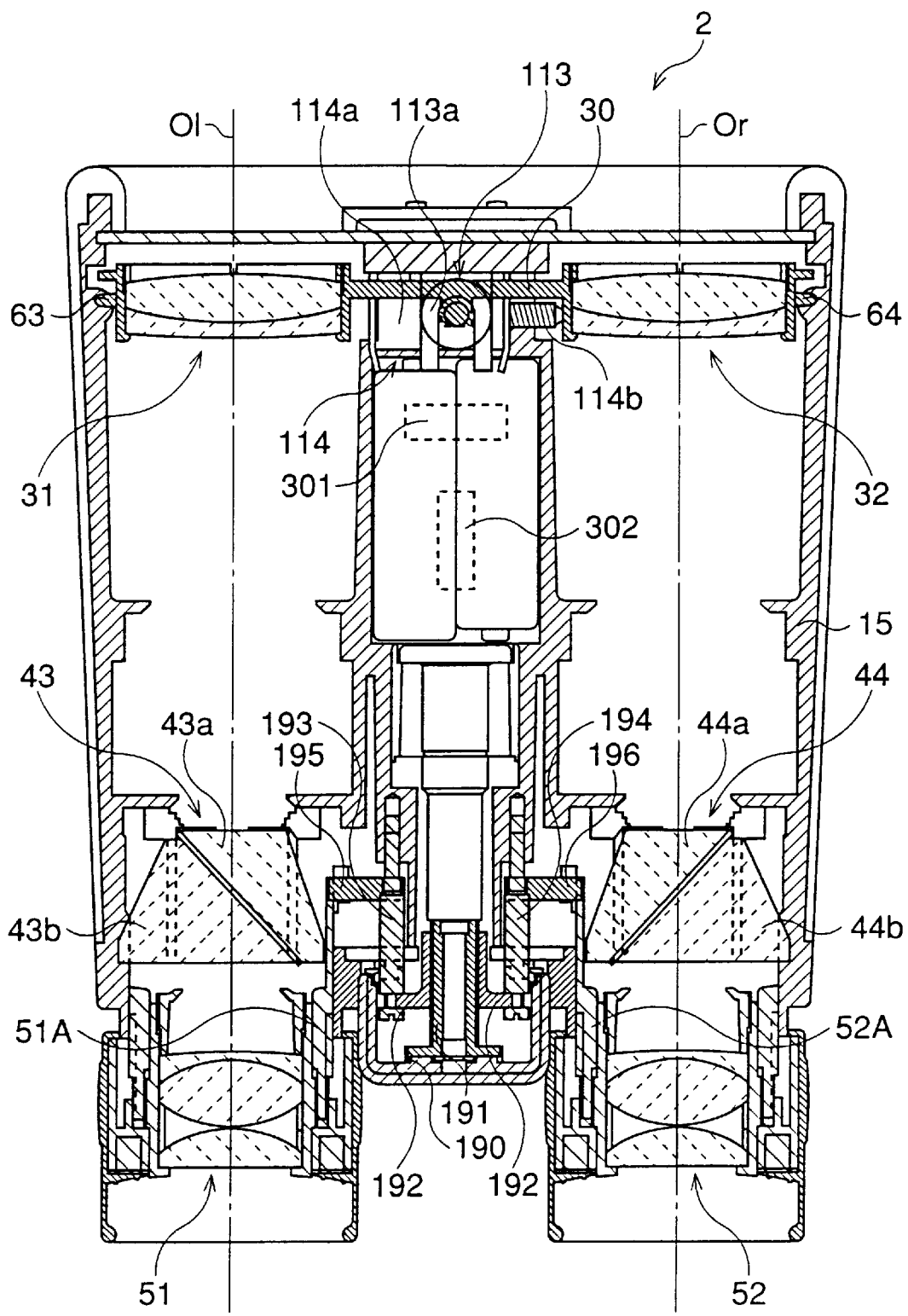
FIG. 4 is a sectional view of binoculars to which a second embodiment is applied.

FIG. 4 is a sectional view of binoculars 2 to which a second embodiment, according to the present invention, is applied. In FIG. 4, components utilized in the first embodiment, which are identical in the second embodiment, share the same reference numerals.

Luminance flux passes through a pair of objective lenses 31 and 32, having respective optical axes Ol and Or, and is directed to a pair of optical inversion systems 43 and 44. The optical inversion system 43 comprises a roof prism 43a and a supporting prism 43b; and the optical inversion system 44 comprises a roof prism 44a and a supporting prism 44b. Luminance flux is directed to a pair of eyepieces 51 and 52, after passing through the pair of optical inversion systems 43 and 44. The eyepiece 51 is securely mounted in the eyepiece barrel 51A, and the eyepiece 52 is securely mounted in the eyepiece barrel 52A. Namely, a left telephoto optical system (a first telephoto optical system) comprises the objective lens 31, the optical inversion system 43, and the eyepiece 51; and a right telephoto optical system (a second telephoto optical system) comprises the objective lens 32, the optical inversion system 44, and the eyepiece 52. Note that detailed optical paths of the optical axes in the optical inversion systems, shown in FIG. 4, are omitted.

A rotation ring 190 is provided between the eyepiece barrel 51A and the eyepiece barrel 52A. A rotation ring axle 191 is attached to the rotation ring 190, on the central axis of the rotation ring 190. A lift axle 192 is threadingly engaged with the rotation ring axle 191. The lift axle 192 comprises a circular plate portion and a cylinder portion. The lift axle 192 is engaged with a pin 193, at the side of the circular plate portion, which is close to the eyepiece barrel 51A, and is engaged with a pin 194, at the side of the circular plate portion, which is close to the eyepiece barrel 52A. The longitudinal portions of the pins 193 and 194, which are oriented in the directions of the optical axes of the eyepieces 51 and 52, are supported by a cover body 15 of the binoculars 2, in such a manner that the pins 193 and 194 can be slid in the direction of the optical axes. Further, the pin 193 is attached to one end of an arm 195. Another end of the arm 195 is attached to the eyepiece barrel 51A. Similarly, the pin 194 is attached to one end of an arm 196, and another end of the arm 196 is attached to the eyepiece barrel 52A.

When the rotation ring 190 is operated, the rotational movement is transmitted to the lift axle 192 via the rotation ring axle 191. Since the lift axle 192 is attached to the pins 193 and 194, the lift axle 192 moves in the direction of the optical axes of the eyepieces 51 and 52, being led by the pins 193 and 194. Namely, the rotational movement of the rotation ring 190 is converted to the longitudinal movement of the lift axle 192, in the direction of the optical axes of the eyepieces 51 and 52. The movement of the lift axle 192 is transmitted to the eyepiece barrel 51A, via the pin 193 and the arm 195 in the left telephoto optical system. Similarly, the movement of the lift axle 192 is transmitted to the eyepiece barrel 52A, via the pin 194 and the arm 196 in the right telephoto optical system. Accordingly, uniform synchronous movement of the eyepiece barrels 51A and 52A is achieved, in accordance with the movement of the lift axle 192 in the direction of the optical axes of the eyepieces 51 and 52.

Namely, the eyepiece barrels 51A and 52A are moved in synchronization along the optical axes of the eyepieces 51 and 52, by rotating the rotation ring 190. Accordingly, a focusing operation can be performed by rotating the rotation ring 190 clockwise or counterclockwise by a predetermined amount.

The objective lenses 31 and 32 are symmetrically and securely held in an objective lens frame 30. The objective lens frame 30, can be moved in the vertical and horizontal directions by a mechanism identical to that shown in FIG. 2. Holes are provided at the left and right end surfaces of the objective lens frame 30. Guide bars 63 and 64 have a similar configuration to the guide bars 61 and 62 of the first embodiment. A part of the guide bar 63 is slidably received by a hole in the left end surface, and a part of the guide bar 64 is slidably received by a hole in the right end surface. Another part of the guide bars 63 and 64 is slidably received and supported by respective projecting portions formed on the inner surface of the cover body 15. Coil springs (not shown in FIG. 4) are located around the guide bars 63 and 64, similarly to the first embodiment. The coil springs urge the objective lens frame 30 in a direction opposite to the direction of drive of actuators described below.

A vertical-direction actuator 113 and a horizontal-direction actuator 114, which, respectively, move the objective lens frame 30 in the vertical and horizontal directions, are provided between the objective lenses 31 and 32. Similarly to the vertical-direction actuator 111 and the horizontal-direction actuator 112 of the first embodiment, the horizontal-direction actuator 114 comprises a stepping motor 114a and a lead screw 114b, and the vertical-direction actuator 113 comprises a stepping motor 113a and a lead screw (not shown). The tip of the lead screw 114 abuts the side surface of a portion of the objective lens frame 30, which holds the objective lens 32 of the right telephoto optical system. The tip of the lead screw of the vertical-direction actuator 113 abuts the projecting portion of the objective lens frame 30, which projects towards the optical inversion systems 43, 44 in the direction of the optical axes Ol and Or.

As described above, similarly to the first embodiment, the objective lens frame 30 is moved in the vertical direction by both the vertical-direction actuator 113 and the coil springs wound around the guide bars 63 and 64, and is moved in the horizontal direction by both the horizontal-direction actuator 114 and the coil springs wound around the guide bar 64.

Further, similarly to the first embodiment, a vertical-tremble detector 301 and a horizontal-tremble detector 302 are provided close to the vertical-direction actuator 113 and the horizontal-direction actuator 114. The binoculars 2 are provided with filters, position detectors, a microcomputer and comparators, similarly to the first embodiment.

The tremble correction position is calculated in the microcomputer, based on the tremble signal detected by the tremble detector. The position signals, i.e. the vertical-position signal and the horizontal-position signal, are detected by the position detectors. In the comparator, the tremble correction position and the position signals are compared, so that the tremble correction signals are outputted from the comparator. The stepping motors of the vertical and horizontal actuators are driven in accordance with the tremble correction signal, thus enabling the vertical and horizontal trembling of the focused image to be corrected.

According to the second embodiment, the objective lenses 31, 32 are used for correcting a trembling of the focused image. Namely, extra optical systems for correcting the trembling of the focused image are unnecessary. Further, since the objective lenses 31 and 32 can be unitarily moved, the structure required for correcting a tremble is simplified.

Figure 5:
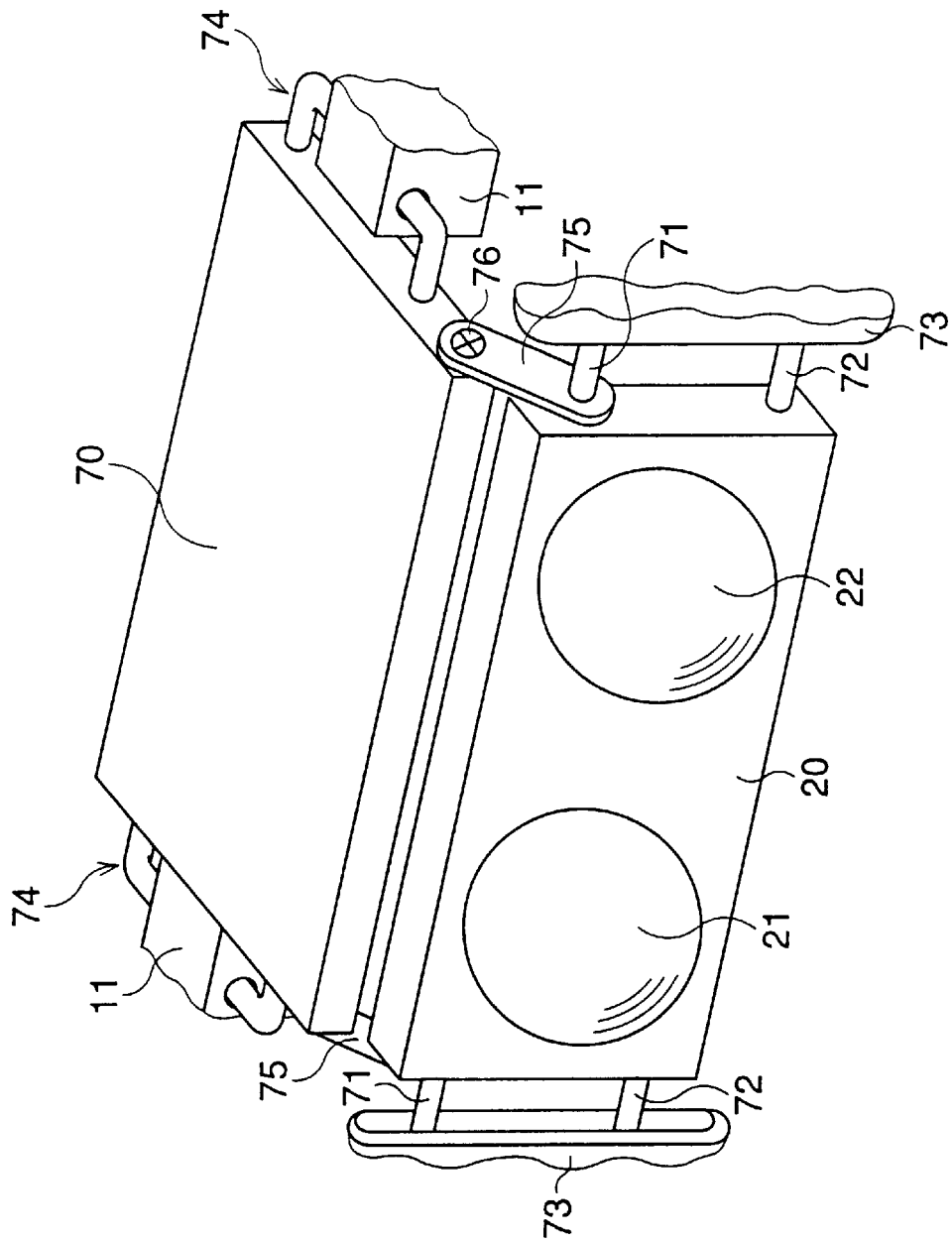
FIG. 5 is a perspective view which shows the arrangement of a tremble correction mechanism of a third embodiment.

FIG. 5 is a perspective view showing the outline of a tremble correction mechanism of a third embodiment, according to the present invention. Note that, the third embodiment is applied to binoculars, similar to the first embodiment.

The correction lenses 21 and 22 are unitarily supported in a holding plate 20. In FIG. 5, at a position near to the upper edge of an end surface of the holding plate 20, a guide pin 71 is formed, and at a position near to the lower edge of an end surface of the holding plate 20, a guide pin 72 is formed. The unattached end of each of the guide pins 71 and 72 is movably supported by a groove of a guide member 73, which is provided on the inner surface of the cover body of the binoculars and allows the movement of the holding plate 20 both in the horizontal and vertical directions with respect to a plane which is perpendicular to both optical axes of the correction lenses 21 and 22.

A driving plate 70 is a rectangular flat plate, which has a plane parallel to a plane on which the optical axes of the correction lenses 21 and 22 lie. The driving plate 70 is placed at the upper side of the holding plate 20, while the binoculars are in normal use. The driving plate 70 is provided with driving mechanisms at predetermined portions, as described below. Guide bars 74 are provided on side surfaces, which are parallel to the optical axes. One portion of the guide bar 74 is received in and slidably supported along its central axis by a projecting portion 11 of the cover body of the binoculars.

An arm 75 is a connecting member, which connects the holding plate 20 and the driving plate 70. The guide pin 71 is received by and rotatably engaged with one end of the arm 75. The arm 75 can be moved in the longitudinal direction of the guide pin 71. At the other end of the arm 75, a hole, in which a bearing (not shown) is inserted, is formed. A screw 76 is received by the hole of the other end of the arm 75, and is threadingly engaged with an adjacent hole formed in the side of the driving plate 70. Namely, the arm 75, being rotatably supported by the central axis of the screw 76, is connected to the driving plate 70.

The width of the driving plate 70, being in the direction which is perpendicular to the optical axes of the correction lenses 21 and 22, is equal to the width of the holding plate 20. The arms 75 can rotate relative to the holding plate 20, and the arms 75 connect the driving plate 70 to the holding plate 20, whereby the driving plate 70 and the holding plate 20 are uniformly and simultaneously moved, the holding plate 20 being displaced in the plane which is perpendicular to the optical axes of the correction lenses 21 and 22. Namely, the link mechanism which transmits the movement of the driving plate 70 to the holding plate 20, comprises the arms 75, the guide pins 71 and 72, and the guide members 73.

When the driving plate 70 moves parallel to the optical axes of the correction lenses 21 and 22, the movement of the driving plate 70 is transmitted to the holding plate 20 via the arms 75, whereby the holding plate 20 moves in the longitudinal direction of the guide members 73, being the vertical direction which is perpendicular to the optical axes of the correction lenses 21 and 22. When the driving plate 70 is moved in the horizontal direction, which is perpendicular to the optical axes of the correction lenses 21 and 22, the arms 75 and the holding plate 20 move unitarily, thus horizontal displacement of the holding plate 20 is achieved.

Figure 6:
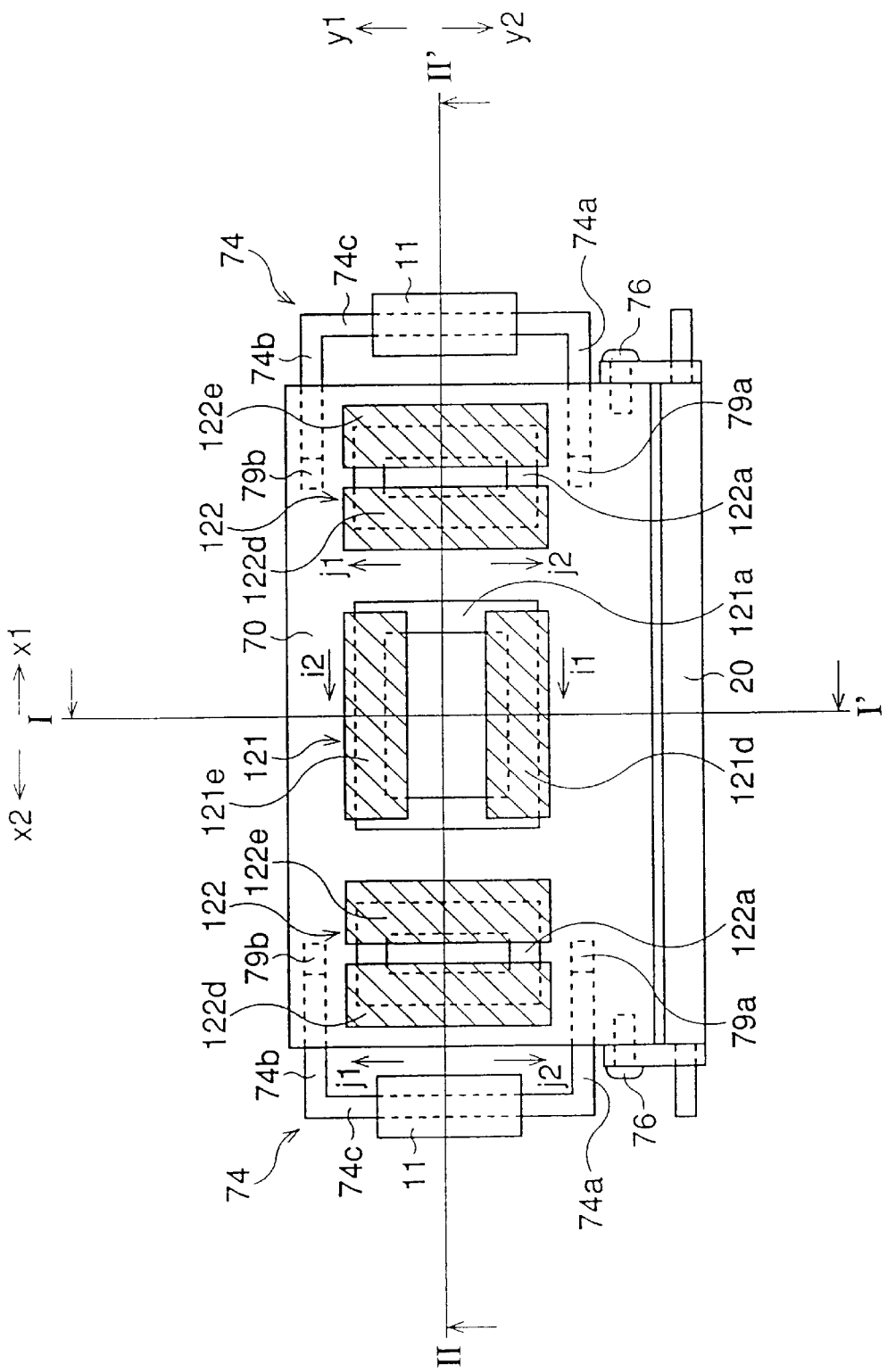
FIG. 6 is a plan view of the tremble correction mechanism of the third embodiment.
Figure 7:
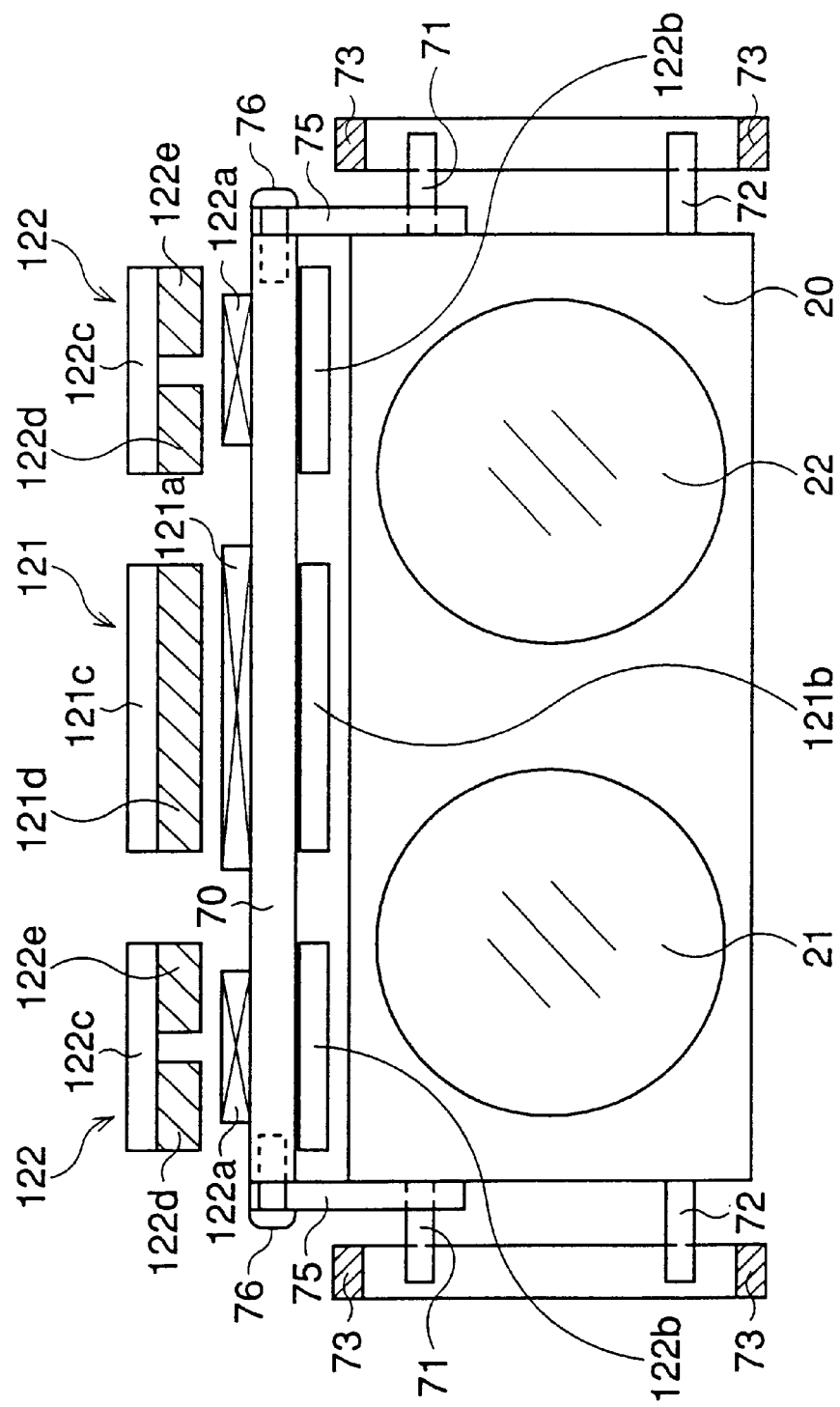
FIG. 7 is a front view of the tremble correction mechanism of the third embodiment.
Figure 8:
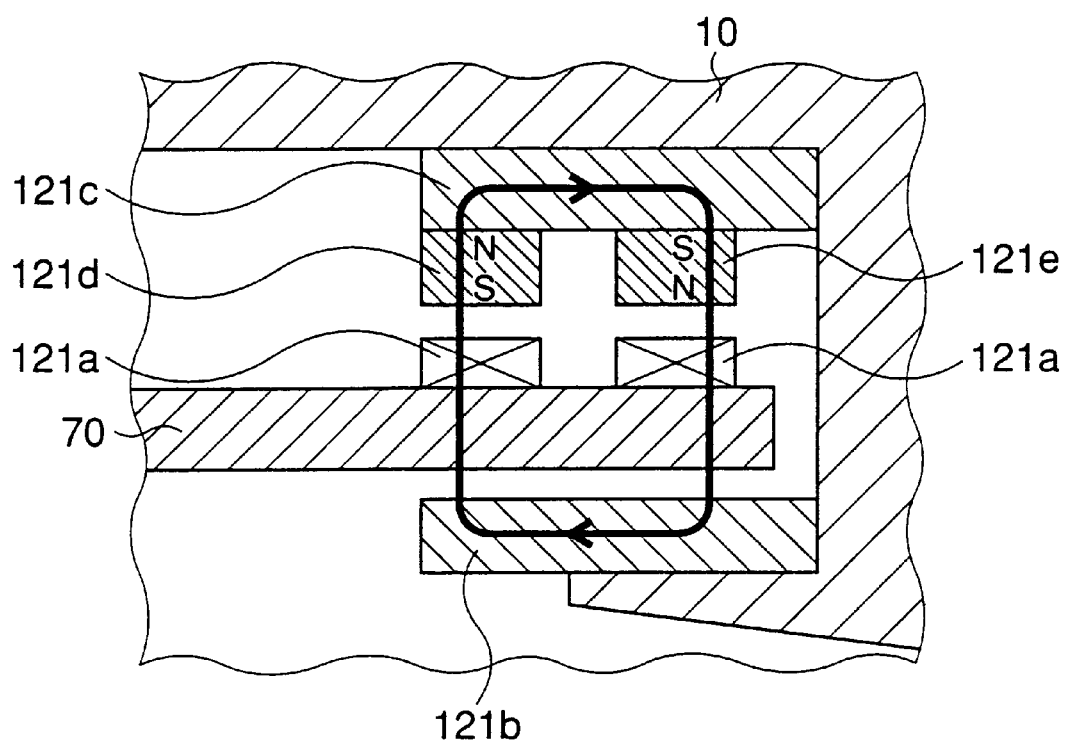
FIG. 8 is a sectional view taken along the line I–I' of FIG. 6, viewed in the direction of the arrows.

FIG. 6 is a plan view of the tremble correction mechanism of the third embodiment, seen from the upper side of the binoculars, FIG. 7 is a front view of the tremble correction mechanism of the third embodiment, seen in the direction y1 of FIG. 6, and FIG. 8 is a sectional view along the line I–I' of FIG. 6, viewed in the direction of the arrows.

Holes 79a and 79b, having a predetermined depth, are formed in the end side surfaces, which are perpendicular to the holding plate 20, of the driving plate 70. The central axes of the holes 79a and 79b lie in a plane parallel to a plane on which the optical axes of the correction lenses 21 and 22 lie, and are perpendicular to the optical axes of the correction lenses 21 and 22. The holes 79a are formed at a position of the side-end surfaces being closest to the screws 76. The holes 79b are formed at a position of the side-end surfaces being furthest from the screws 76. A horizontal-drive mechanism 122 is disposed between the hole 79a and the hole 79b.

Each of the guide bars 74 comprise horizontal-direction guide portions 74a and 74b, and a vertical-direction guide portion 74c. The central axes of the horizontal-direction guide portions 74a and 74b are parallel to each other. The vertical-direction guide portion 74c connects the horizontal-direction guide portions 74a and 74b. The central axes of the horizontal-direction guide portions 74a and 74b are perpendicular to the optical axes of the correction lenses 21 and 22. The central axis of the vertical-direction guide portion 74c is parallel to the optical axes of the correction lenses 21 and 22.

The horizontal-direction guide portions 74a are slidably received by the holes 79a, and the horizontal-direction guide portions 74b are slidably received by the holes 79b. Further, as described previously, the vertical-direction guide portions 74c are received and slidably supported by the protecting portions 11. Namely, the driving plate 70, being supported by the guide bars 74, is movable in the directions x1 and x2, which are perpendicular to the optical axes of the correction lenses 21 and 22, and in the directions y1 and y2, which are parallel to the optical axes of the correction lenses 21 and 22.

The vertical-direction drive mechanism 121 (a first drive mechanism) is placed at a position corresponding to the center of the driving plate 70, and comprises a coil 121a, a first yoke 121b, a second yoke 121c, a magnet 121d and a magnet 121e. The coil 121a is provided on the upper surface of the driving plate 70. The first yoke 121b is attached to the cover body of the binoculars (see FIG. 8), being placed at the position corresponding to the coil 121a, and facing the lower surface of the driving plate 70. The second yoke 121c is attached to the cover body of the binoculars, being placed at the position which faces the coil 121a. The magnets 121d and 121e are magnetically attached to the second yoke 121c. Each of the magnets 121d and 121e is a rectangularly shaped plate, a longitudinal direction of which is perpendicular to the optical axes of the correction lenses 21 and 22.

Horizontal-direction drive mechanisms 122 are placed symmetrically about the vertical-direction drive mechanism 121 in the x1 and x2 directions, respectively. Namely, the vertical-direction drive mechanism 121 is placed between a pair of the horizontal-direction drive mechanisms 122.

Each of the horizontal-direction drive mechanisms 122 comprises a coil 122a, a first yoke 122b, a second yoke 122c, a magnet 122d and a magnet 122e. The coil 122a is provided on the upper surface of the driving plate 70. The first yoke 122b is securely attached to the cover body of the binoculars, being placed at the position corresponding to the coil 122a, and facing the lower surface of the driving plate 70. The second yoke 122c is securely attached to the cover body of the binoculars, being placed at the position which faces the coil 122a. The magnets 122d and 122e are magnetically attached to the second yoke 122c. Each of the magnets 122d and 122e is a rectangular plate, a longitudinal direction of which is parallel to the optical axes of the correction lenses 21 and 22.

Namely, the vertical-direction drive mechanism 121 and the horizontal-direction drive mechanisms 122 are placed symmetrically with respect to a central axis of the driving plate 70, being parallel to the optical axes of the correction lenses 21 and 22. Note that, a pair of the vertical-direction drive mechanisms 121 may be placed symmetrically about one horizontal-direction drive mechanism 122, which is positioned at the center of the driving plate 70.

With respect to FIG. 8, the second yoke 121c is securely attached to the upper side of the inner surface of the cover body 10 of the binoculars. The first yoke 121b is securely attached to a projection of the inner surface of the cover body 10. A predetermined distance exists between the first yoke 121b and the second yoke 121c. The magnets 121d and 121e are magnetically attached to the lower surface of the second yoke 121c. The upper side of the magnet 121d is the North pole, and the lower side of the magnet 121d is the South pole. The upper side of the magnet 121e is the South pole, and the lower side of the magnet 121e is the North pole. On the upper surface of the driving plate 70, the coil 121a is provided. The driving plate 70 is placed between the magnets 121d, 121e and the first yoke 121b, in such a manner that the coil 121a is placed at a position facing the magnets 121d and 121e. Namely, the coil 121a is positioned in the magnetic field, produced by the magnets 121d, 121e, the first yoke 121b and the second yoke 121c, so that a magnetic flux acts on the coil 121a.

Accordingly, as shown in FIG. 6, when a current flows through the coil 121a in the direction i1 (clockwise in FIG. 6), an induced electromagnetic force acts on the coil 121a, in the direction y1 which is parallel to the optical axes of the correction lenses 21 and 22. As the coil 121a is attached to the driving plate 70, the driving plate moves in the direction y1, in accordance with the induced electromagnetic force.

Similarly, when a current flows through the coil 121a in the direction i2 (counterclockwise in FIG. 6), the driving plate 70 moves in the direction y2.

Figure 9:
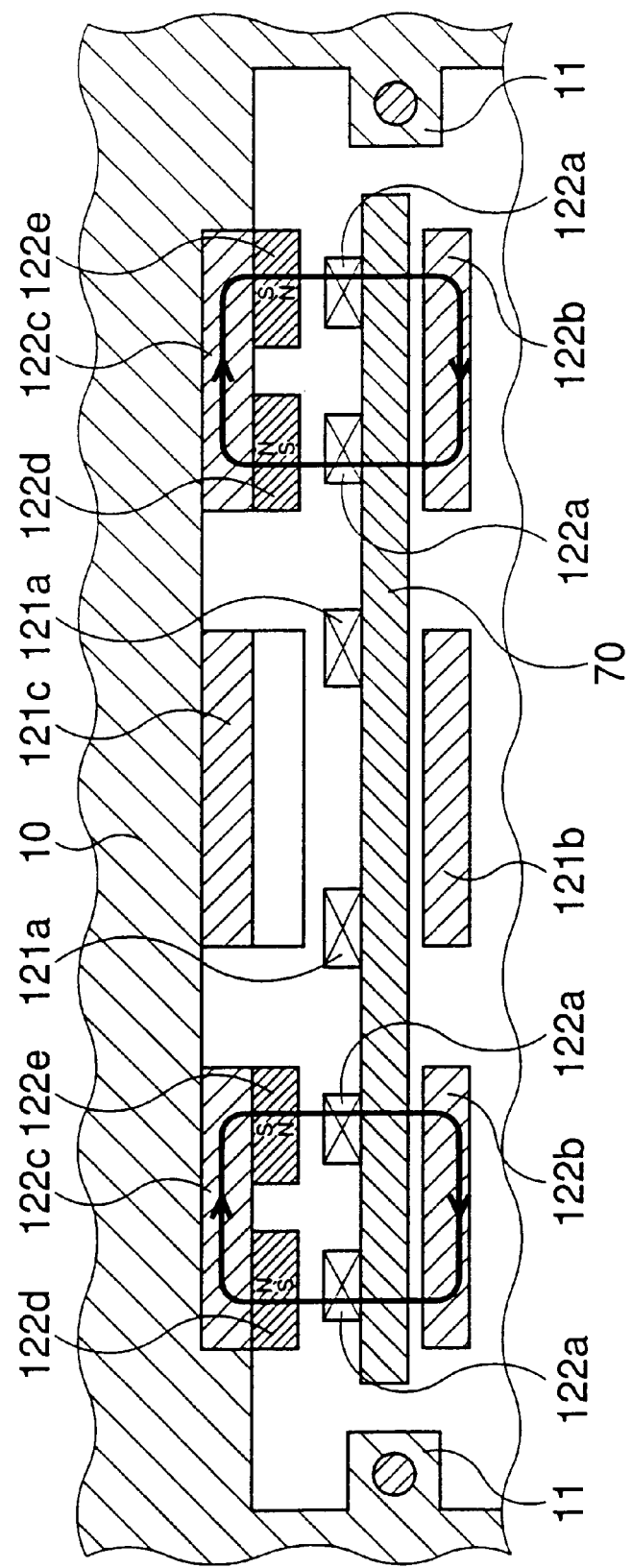
FIG. 9 is a sectional view taken along the line II–II' of FIG. 6, viewed in the direction of the arrows.

FIG. 9 is a sectional view taken along the line B–B' of FIG. 6, viewed in the direction of the arrows. In regards to one horizontal-direction drive mechanism 122, on the upper surface of the driving plate 70, the coil 122a is provided. The driving plate 70 is placed between the magnets 122d, 122e and the first yoke 122b, in such a manner that the coil 122a is placed at a position facing to the magnets 122d and 122e. The upper side of the magnet 122d is the North pole, and the lower side of the magnet 122d is the South pole. The upper side of the magnet 122e is the South pole, and the lower side of the magnet 122e is the North pole. Namely, the coil 122a is positioned in the magnetic field produced by the magnets 122d, 122e, the first yoke 122b and the second yoke 122c, so that a magnetic flux acts on the coil 122a.

Accordingly, as shown in FIG. 6, when a current flows through the coil 122a in the direction j1 (clockwise in FIG. 6), an induced electromagnetic force acts on the coil 122a in the direction x1, which is perpendicular to the optical axes of the correction lenses 21 and 22. As the coil 122a is attached to the driving plate 70, the driving plate 70 moves in the direction x1, in accordance with the induced electromagnetic force. Similarly, when a current flows through the coil 122a in the direction j2 (counterclockwise in FIG. 6), the driving plate 70 moves in the direction x2.

Simultaneous operation of the horizontal-direction drive mechanisms 122, as described above, is performed, enabling the driving plate 70 to be smoothly moved in the x1 or x2 directions.

Figure 10:
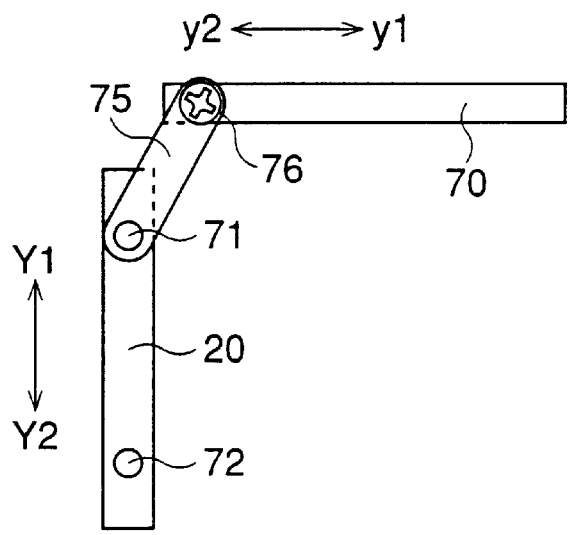
FIG. 10 is a side view of the link mechanism of the third embodiment.

FIG. 10 is a side view of the link mechanism of the third embodiment, when viewing in the x2 direction along the driving plate 70. When the driving plate 70 is moved in either the y1 or y2 directions by the vertical-direction drive mechanism 121, the displacement of the driving plate 70 is transmitted to the holding plate 20, via the screw 76, the arm 75, and the guide pin 71, as previously described.

Figure 11:
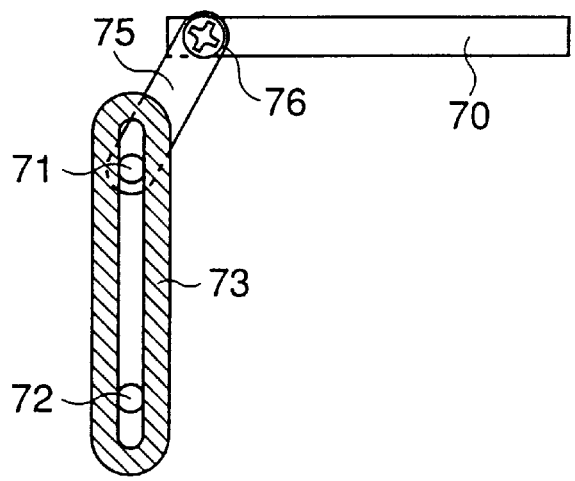
FIG. 11 is a side view of the link mechanism of the third embodiment.

Further, as shown in FIG. 11, the guide pins 71 and 72 are movably supported by the groove of the guide member 73, so that the movement of the holding plate 20 is directed by the groove of the guide member 73 via the guide pins 71 and 72. Accordingly, the movement of the driving plate 70 in the direction y1 is converted to the movement of the holding plate 20 in the direction Y1, and the movement of the driving plate 70 in the direction y2 is converted to the movement of the holding plate 20 in the direction Y2.

On the other hand, when the driving plate 70 moves in the directions x1 or x2 (see FIG. 6), the holding plate 20 is moved in the directions x1 or x2, due to the screw 76, the arm 75 and the guide pin 71.

Namely, when a current flows in a predetermined direction through the coil 121a of the vertical-direction drive mechanism 121, the holding plate 20 is moved in a predetermined vertical direction by the driving plate 70, via the arms 75, and when a current flows in a predetermined direction through the coil 122a of the horizontal-direction drive mechanism 122, the holding plate 20 moves in a predetermined horizontal direction.

Accordingly, by controlling the direction and magnitude of the current flowing through the coil 121a and the coils 122a, a trembling of the focused image, occurring due to hand tremble while holding the binoculars, is counteracted.

Namely, in the third embodiment, the direction and the amount of the movement of the focused image, occurring due to hand tremble, are detected similarly to the first and second embodiments, and the direction and the magnitude of the current flowing through the coils 121a and 122a are controlled, so that the driving plate 70 is moved in such a manner that the direction and the amount of the movement of the perceived image, due to the trembling, are canceled.

Figure 12:
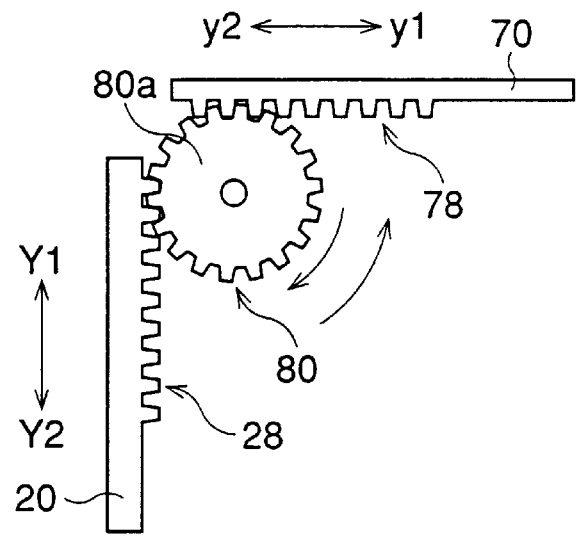
FIG. 12 is a sectional side view of a link mechanism, taken through the center of a pinion gear to which a fourth embodiment, according to the present invention, is applied.

FIG. 12 is a sectional view of a link mechanism, taken through the center of a pinion gear, parallel to the optical axes of the correction lenses which proceed in the direction y1, to which a fourth embodiment, according to the present invention, is applied. A spur gear 80 is a common pinion to both a rack 78, formed on the driving plate 70, and a rack 28, formed on the holding plate 20. The movement of the driving plate 70 is transmitted to the holding plate 20 via the spur gear 80. The other structures are similar to those of the third embodiment. When the driving plate 70 is moved in the direction y1 by the vertical-direction drive mechanism 121, the spur gear 80 rotates clockwise, as shown by FIG. 12. The holding plate 20 moves in the direction Y1 in accordance with the clockwise rotation of the spur gear 80. Similarly, when the driving plate 70 is moved in the direction y2 by the vertical-direction drive mechanism 121, the spur gear 80 rotates counterclockwise. The holding plate 20 moves in the direction Y2 in accordance with the counterclockwise rotation of the spur gear 80.

Figure 13:
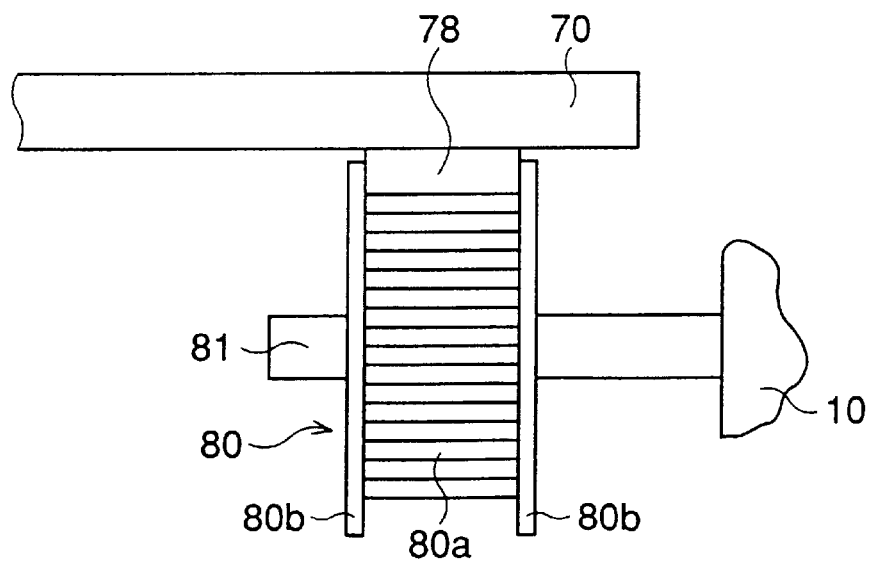
FIG. 13 shows the link mechanism of the fourth embodiment from a holding plate perspective.

FIG. 13 shows the link mechanism of the fourth embodiment, viewed in the direction y1. Note that, for the purpose of simplifying the illustration, the holding plate 20 is omitted. The width of a body 80a of the spur gear 80 on which cogs are formed, approximately equals the width of the rack 78 of the driving plate 70 and the width of the rack 28 of the holding plate 20. At each side of the body 80a, a flange 80b is provided. The flange 80b is a circular plate. The diameter of the flange 80b is larger than the diameter of the body 80a by a predetermined amount. Namely, a portion of the left and right side surfaces of the racks 78 and 28 are in contact with a portion of the peripheral inner surface of the flanges 80b, at all times. Further, the spur gear 80 is received by a bearing 81 through the center of the body 80a, in such a manner that the spur gear 80 is rotatable around and slidably supported by the bearing 81.

Namely, the movement of the driving plate 70 in the directions x1 and x2 (see FIG. 3) is transmitted to the holding plate 20 via the rack 78 of the driving plate 70, the bearing 81, the flanges 80b and the rack 28 of the holding plate 20. Accordingly, the movement of the holding plate 20 in the directions x1 and x2, is unitary with the movement of the driving plate 70.

As described above, according to the third and the fourth embodiments, the driving plate is disposed on a plane which is parallel to the plane in which the optical axes of the correction lenses lie, and the driving mechanism is also placed on a plane which is parallel to the plane on which the optical axes of the correction lenses lie. Accordingly, the inner space of the binoculars can be effectively utilized, enabling the realization of a compact structure. Thus, slim binoculars can be produced.

According to the present invention, the trembling of the focused images both on the first telephoto optical system and on the second telephoto optical system can be corrected simultaneously by driving only the holding member. Further, it is unnecessary to modify an ordinary structure of the optical inversion systems or eyepieces included in the first and second telephoto optical systems. Furthermore, the optical correction systems are easily incorporated into the telephoto optical systems by disposing the holding member between the optical inversion systems and the objective lenses. In other words, a majority of existing components of a pair of ordinary binoculars can be utilized, and modification of the structure of the ordinary binoculars plus the addition of extra components are minimized. Namely, design and manufacture of a pair of binoculars to includ the mechanism correcting a trembling of a focused image is simplified.

As described above, according to the present invention, the first and the second optical correction systems are held by the holding member, and by driving the holding member, the trembling of the perceived focused image is corrected. Accordingly, one set of an actuator and a detector need only be provided for each of a vertical trembling and a horizontal trembling about an optical axis, enabling the control of a tremble correction system to be simplified and the structure of a tremble correction system to be compact.

Although the embodiments of the present invention have been described herein with reference to the accompanying drawings, obviously many modifications and changes may be made by those who skilled in this art without departing from the scope of the invention.

The present disclosure relates to subject matter contained in Japanese Patent Applications No.09-121789 (filed on Apr. 24, 1997) and No.09-126449 (filed on Apr. 30, 1997) which are expressly incorporated herein, by reference, in their entirety.

What is claimed is:

1. A mechanism correcting a trembling of a focused image comprising:

a holding member that holds a first optical correction system and a second optical correction system, said first optical correction system correcting a trembling of a focused image on a first optical axis of a first telephoto optical system, said second optical correction system correcting a trembling of a focused image on a second optical axis of a second telephoto optical system;

two guide members positioned such that the first optical axis and the second optical axis are between said two guide members, said two guide members guiding said holding member for movement in two directions of a plane perpendicular to said first optical axis and said second optical axis; and a control member that drives said holding member along said two guide members in the two directions of the plane perpendicular to said first optical axis and said second optical axis;

whereby a trembling of a focused image formed by both said first telephoto optical system and said second telephoto optical system is corrected.

2. A mechanism correcting a trembling of a focused image according to claim 1, wherein said first telephoto optical system includes a first optical inversion system;

said second telephoto optical system includes a second optical inversion system; and said holding member is disposed closer to an object than said first optical inversion system and said second optical inversion system.

3. A mechanism correcting a trembling of a focused image according to claim 2, wherein said first telephoto optical system includes a first objective lens and said second telephoto optical system includes a second objective lens, said holding member being provided in such a manner that said first optical correction system is disposed between said first optical inversion system and said first objective lens, and said second optical correction system is disposed between said second optical inversion system and said second objective lens.

4. A mechanism correcting a trembling of a focused image according to claim 1, wherein said first optical correction system and said second optical correction system are objective lenses.

5. A mechanism correcting a trembling of a focused image according to claim 1, wherein said control member comprises at least one direct-drive-type actuator.

6. A mechanism correcting a trembling of a focused image according to claim 3, wherein said first telephoto optical system includes a first eyepiece, and said second telephoto optical system includes a second eyepiece;

said first optical inversion system and said first eyepiece being unitarily supported so as to be rotatable around the optical axis of said first objective lens; and said second optical inversion system and said second eyepiece being unitarily supported so as to be rotatable around the optical axis of said second objective lens;

whereby interpupillary adjustment can be performed.

7. A mechanism correcting a trembling of a focused image according to claim 1, wherein said first telephoto optical system includes a first eyepiece, and said second telephoto optical system includes a second eyepiece;

said first eyepiece and said second eyepiece being unitarily driven in such a manner that said first eyepiece is moved along the optical axis of said first eyepiece and said second eyepiece is moved along the optical axis of said second eyepiece, so that a focusing operation can be performed.

8. A mechanism correcting a trembling of a focused image according to claim 1, further comprises:

a driving plate positioned in a plane parallel to a first plane on which both said first optical axis and said second optical axis lie;

a drive system that moves said driving plate in said parallel plane; and a link mechanism that converts movement of said driving plate in said parallel plane to movement of said holding member in a second plane perpendicular to said first optical axis and said second optical axis.

9. A mechanism correcting a trembling of a focused image according to claim 8, wherein said movement of said driving plate, on said parallel plane, which is perpendicular to said first optical axis and said second optical axis, is transmitted to said holding member by said link mechanism, so that said holding member is moved in the direction which is parallel to said first plane and is perpendicular to said first optical axis and said second optical axis; and movement of said driving plate, on said parallel plane, which is parallel to said first optical axis and said second optical axis, is transmitted to said holding member by said link mechanism, so that said holding member is moved in the direction which is perpendicular to said first plane, said holding member being a rectangular plate.

10. A mechanism correcting a trembling of a focused image according to claim 8, wherein said mechanism is applied to binoculars.

11. A mechanism correcting a trembling of a focused image according to claim 10, wherein said driving plate is positioned at the upper side of said holding member in a state that said binoculars are normally used.

12. A mechanism correcting a trembling of a focused image according to claim 11, wherein said link mechanism is disposed beyond the periphery of said first optical correction system and said second optical correction system.

13. A mechanism correcting a trembling of a focused image according to claim 10, wherein said drive system comprises a first drive mechanism moving said holding member in the direction which is parallel to said first plane and is perpendicular to said first optical axis and said second optical axis; and a second drive mechanism moving said holding member in the direction which is perpendicular to said first plane.

14. A mechanism correcting a trembling of a focused image according to claim 13, wherein each of said first drive mechanism and said second drive mechanism comprises:

a coil fixed on the upper surface of said driving plate;

a first yoke fixed on the inner side of the body of said binoculars, facing the lower side of said driving plate;

a second yoke fixed at a portion of the inner surface of the body of said binoculars, which corresponds to said first yoke; and a magnet attached to said second yoke;

wherein said coil is placed within the magnetic field produced by said magnet and said first yoke and said second yoke.

15. A mechanism correcting a trembling of a focused image according to claim 13, wherein said link mechanism comprises:

a guide pin fixed on said holding member;

a screw engaged with said driving plate;

a link that includes a holding member supporting portion by which said guide pin is received, so that said guide pin is supported, a drive system supporting portion with which said screw is threadingly and rotatably engaged, and a connecting portion which connects said holding member supporting portion and said drive system supporting portion; and a guide groove fixed on the body of said binoculars, which leads said guide pin.

16. A mechanism correcting a trembling of a focused image according to claim 13, wherein said link mechanism comprises:

a gear which is engaged with a rack provided at one end of said driving plate and a rack provided at one end of said holding member;

a guide pin fixed on the side of said holding member; and a guide groove fixed on the inner side of the body of said binoculars, which leads said guide pin.

17. A mechanism correcting a trembling of a focused image according to claim 13, wherein both of said first drive mechanism and said second drive mechanism are placed symmetrically about a central axis of said driving plate, which is parallel to said optical axis of said first telephoto optical system and said optical axis of said second telephoto optical system.

18. A mechanism correcting a trembling of a focused image according to claim 17, wherein one of said first drive mechanism and said second drive mechanism is positioned on the center of said driving plate, and another one of said first drive mechanism and said second drive mechanism comprises two parts, the two parts being disposed symmetrically about said one of said first drive mechanism and said second drive mechanism which is positioned on the center of said driving plate.

19. A mechanism correcting a trembling of a focused image, comprising:

a holding plate that unitarily holds a pair of optical correction systems which correct a trembling of a focused image on optical axes of a pair of telephoto optical systems;

a driving plate disposed parallel to a plane on which said optical axes lie;

a drive system that moves said driving plate in a plane parallel to said optical axes plane;

two guide members positioned such that said optical axes are between said two guide members, said two guide members guiding said holding plate for movement in a direction perpendicular to the plane in which said optical axes lie; and a link mechanism that connects said driving plate and said holding plate and converts movement of said driving plate in said parallel plane to movement of said holding plate along said guide members.

20. A mechanism correcting a trembling of a focused image comprising:

a first optical correction system disposed coaxially with a first optical axis of a first telephoto optical system;

a second optical correction system disposed coaxially with a second optical axis of a second telephoto optical system;

a holding member that holds said first optical correction system and said second optical correction system;

two guide members positioned such that the first optical axis and the second optical axis are between said two guide members, said two guide members guiding said holding member for movement in two directions of a plane perpendicular to said first optical axis and said second optical axis;

a control member that drives said holding member along said two guide members in the two directions of the plane perpendicular to said first optical axis and said second optical axis, so that a trembling of a focused image on said first optical axis and said second optical axis is corrected.

21. A mechanism correcting a trembling of a focused image comprising:

a first optical correction system that includes a first optical axis on which an image is focused;

a second optical correction system that includes a second optical axis on which said image is focused;

a holding member that holds said first optical correction system and said second optical system;

two guide members positioned such that the first optical axis and the second optical axis are between said two guide members, said two guide members guiding said holding member for movement in two directions of a plane perpendicular to said first optical axis and said second optical axis; and a control member that drives said holding member along said two guide members in the two directions of the plane perpendicular to said first optical axis and said second optical axis, so that a trembling of said image focused on said first and second optical axes is corrected.

22. A mechanism correcting a trembling of a focused image comprising:

means for unitarily holding a pair of optical correction systems which correct a trembling of a focused image on optical axes of a pair of telephoto optical systems;

means for guiding said holding means for movement in two directions of a plane perpendicular to said first optical axis and said second optical axis, said guiding means having two parts positioned such that the optical axes are between said two parts; and means for driving said holding means along said guiding means in the plane perpendicular to said optical axes.

23. A mechanism correcting a trembling of a focused image, comprising:

a holding member that holds a first optical correction system and a second optical correction system, said first optical correction system correcting a trembling of a focused image on a first optical axis of a first telephoto optical system, said second optical correction system correcting a trembling of a focused image on a second optical axis of a second telephoto optical system, said first optical correction system and said second optical correction system being objective lenses; and a control member that drives said holding member in the two directions of a plane perpendicular to said first optical axis and said second optical axis;

whereby a trembling of a focused image formed by both said first telephoto optical system and said second telephoto optical system is corrected.

* * * * *